Figure 1:
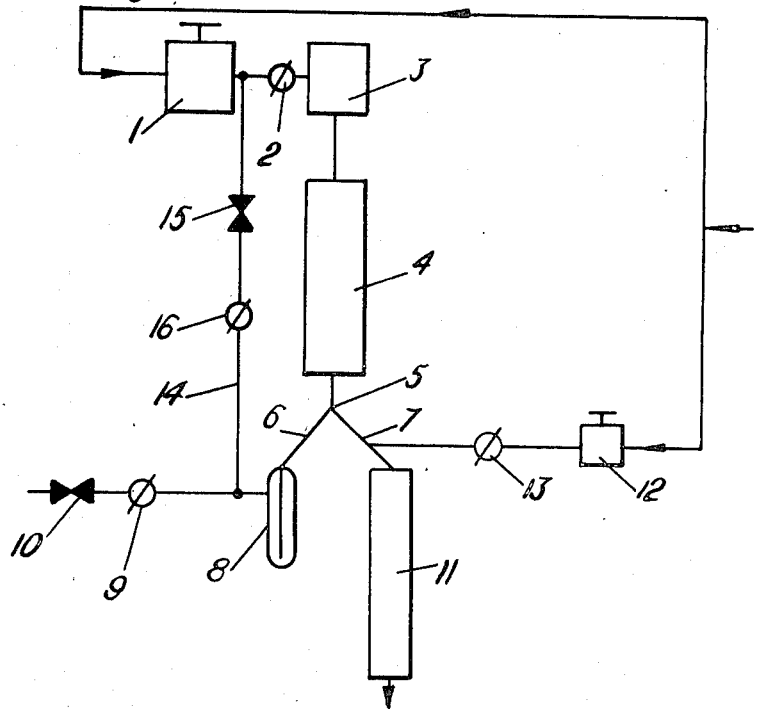

United States Patent [19]
Deans

[11] 3,712,028
[45] Jan. 23, 1973

[54] GAS FLOW SWITCHING METHOD AND APPARATUS

[75] Inventor: David Robert Deans, Norton-on-Tees, County Durham, England

[73] Assignee: Imperial Chemical Industries Ltd., London, England

[22] Filed: Jan. 14, 1971

[21] Appl. No.: 106,571

Related U.S. Application Data

[63] Continuation of Ser. No. 779,780, Nov. 29, 1968, abandoned.

[30] Foreign Application Priority Data

Dec. 1, 1967 Great Britain.....................54,866/67

[52] U.S. Cl..........................................55/67, 55/197
[51] Int. Cl. ................................................B01d 15/08

[58] Field of Search ...........73/23.1; 55/67, 197, 386; 137/81.5

[56] References Cited

UNITED STATES PATENTS

| | | | |
|---|---|---|---|
| 3,273,377 | 9/1966 | Testerman et al................ | 137/81.5 X |
| 3,357,233 | 12/1967 | Roof................................. | 137/81.5 X |
| 3,374,799 | 3/1968 | Lyman ............................. | 137/81.5 |

*Primary Examiner*—John Adee
*Attorney*—Cushman, Darby & Cushman

[57] ABSTRACT

A gas flow switch for gas chromatography operates by passing a gas stream through a multi-outlet junction and blocking all but a selected one of the outlet limbs to the stream, at least one outlet limb being bloackable by feeding gas at a controlled pressure to it.

9 Claims, 3 Drawing Figures

GAS FLOW SWITCHING METHOD AND APPARATUS

This application is a continuation of copending application Ser. No. 779,780, filed Nov. 29, 1968, and now abandoned.

This invention relates to gas flow switching.

In gas chromatographic analysis it is frequently desired to pass a gas stream through a first chromatographic column and to pass the stream emerging from the first column during part of the cycle of operations through a second column and during another part of the cycle of operations to divert it therefrom, for example, to a third column or a storage device.

Switches at present in use commonly employ slides which move in the path of the gas. These are often unfavorably affected by high temperatures which are sometimes encountered and also involve the introduction of a certain amount of dead volume. This is troublesome, for example, in systems for separating different groups of compounds from one another whilst compensating for the effect of differing boiling points on the separation by switching techniques.

This invention provides a switch for diverting a flow of gas which comprises a gas flow-through junction having at least three limbs, one limb being a gas inlet limb and at least two other limbs being gas outlet limbs, a first outlet limb being provided with means for passing gas at a controlled, for example constant, pressure to a point in the limb, the remaining limbs being provided with means for preventing gas passing through them from the junction.

In the simplest form of the invention three limbs only are provided. In more elaborate forms of the invention three or more outlet limbs are provided.

The switch may be operated when gas is passed into the gas inlet by applying a controlled gas pressure to the first outlet limb equal to or slightly in excess of the pressure arising at that point due to the flow of gas through the junction and permitting gas to flow from the junction through another outlet limb (hereinafter called the operative outlet limb). A greater pressure may of course be applied, in which case gas passes from the first outlet limb into the operative outlet limb together with gas from the inlet limb.

The invention may be used in a number of ways; for example the operative outlet limb may lead to or contain a chromatographic column or a storage device, for example a cold trap.

According to one form of the invention the means for preventing gas passing from the junction through the remaining outlet limbs comprises means for passing gas at a controlled pressure to them. In this form the device is operated by alternatively providing a controlled pressure in all but one of the outlet limbs equal to or in excess of that arising from a flow of gas through the junction. The gas flow through the junction is thereby diverted through the limb to which the controlled pressure is not applied.

It is an attractive feature of this form of the invention that the same controlled pressure source may be used to supply all outlet limbs of the junction. It is a further advantage, when the same controlled pressure source supplies all outlet limbs, that if the resistance to gas flow beyond each of the outlet limbs is substantially the same, the gas flow passing from the controlled pressure source to each of the limbs will be substantially the same. This can lead to considerable simplification of the design when a constant pressure source is required as it need provide a constant pressure at only one rate of flow. Thus if a constant gas pressure is required, the outlet limbs may be fed through a let down valve such as a needle valve from a constant pressure source operating at a different pressure. Such a source will normally be required to supply carrier gas to the system as a whole.

If the resistance to gas flow beyond each of the outlet limbs is not the same, the pressure supplied to each of the outlet limbs is preferably equal to or greater than that required when the gas flow from the inlet limb is diverted to the outlet limb having the greatest resistance to gas flow on its outlet side, as this avoids resetting the pressure during a switching operation. It also means that the flow through to a column feeding the inlet limb is not affected by the switching process as the pressure in the junction remains constant. If the source feeding such a column is a pressure programmer, and the pressure applied to the outlet limb or limbs is fixed at the highest pressure required in the cycle of operations, the flow through the said column can be programmed without varying the flow from the outlet limbs.

In one form of the invention, when it is desired to programme the flow of gas through the outlet limbs without programming the flow through a column feeding the inlet limb of the junction, a pressure programmer feeding the inlet column and a programmer feeding the junction are each set to supply carrier gas at pressures fixed with respect to a pressure of a gas fed to control zones in both programmers. Thus varying the reference pressure varies the pressure at the junction but not the pressure difference across the inlet column.

In a very simple form of the invention, in which the resistance to gas flow beyond each of the outlet limbs is substantially equal, the means for feeding gas at a controlled pressure to the junction may be a line connected to a source of carrier gas for the system through a column packed with granular material which column provides an appropriate resistance to gas flow. If the pressure fed to a chromatographic column feeding the inlet is constant, the flow rates through all columns are constant; if it is programmed the gas flows through all columns are programmed.

Flow controllers or pressure programmers may be used as the source of carrier gas to the system as a whole, but constant pressure controllers are normally used.

According to a further form of the invention, when a gas outlet limb provided with means for passing gas to a point in it at a controlled pressure feeds a chromatographic column in which it is desired to hold material for part of a cycle of operations, means is provided for feeding gas, at substantially the same pressure, to the outlet side of the said column.

Figure 2:
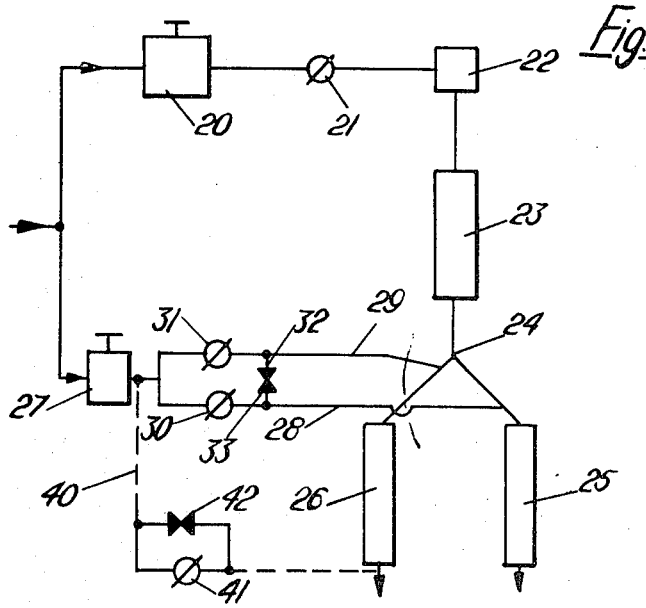
Figure 3:
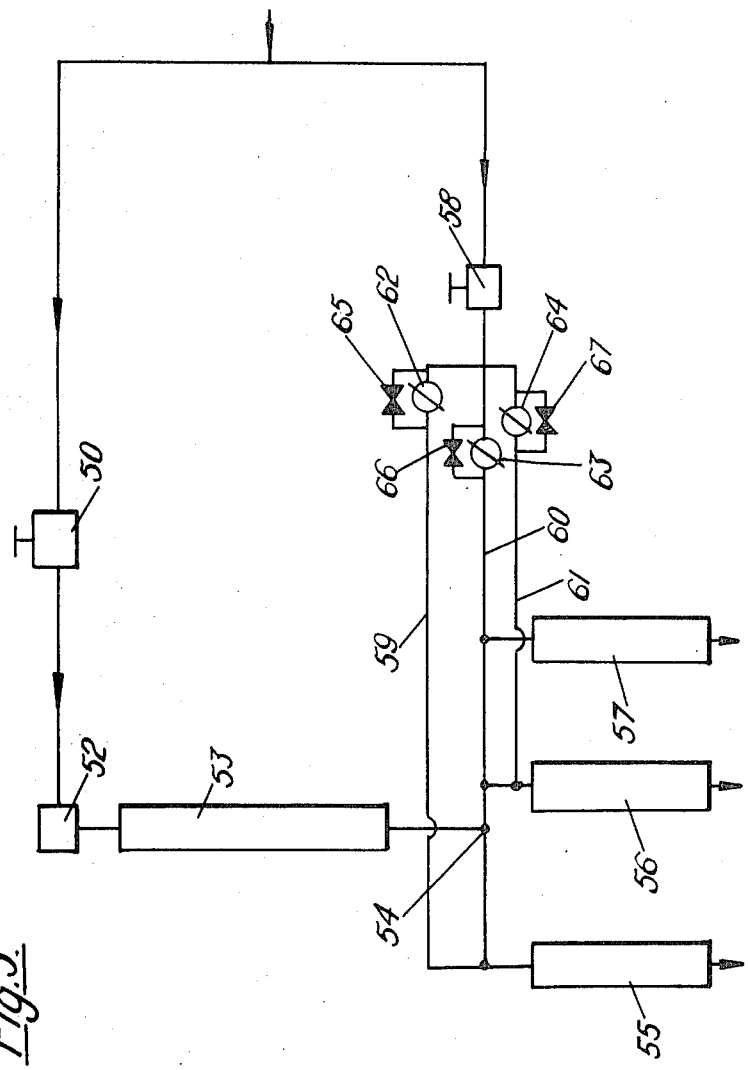

A number of specific forms of the invention will now be described with reference to the accompanying drawings, in which FIGS. 1, 2 and 3 represent various ways of using the invention.

In a first specific form, which will now be described with reference to FIG. 1, the invention is applied in a system wherein the effluent from a chromatographic column is shunted at will into a cold trap or a second chromatographic column.

A constant pressure gas controller 1 feeds carrier gas through an on/off tap 2 to a conventional sample introduction device 3 which leads to a first chromatographic column 4 on the outlet side of which there is a junction 5 having two outlet limbs 6 and 7. The outlet limb 6 leads through a cold trap 8, an on/off tap 9 and a needle valve 10 to the atmosphere and the second outlet limb 7 leads to a second chromatographic column 11. The second limb 7 is connected to a second constant pressure controller 12 through a line which is closable by an on/off tap 13. A line 14 is provided from the outlet side of the cold trap through a needle valve 15 and an on/off tap 16. Taps 2 and 13 are not essential to the operation of the system but are provided for ease of setting up the apparatus, and in the case of tap 2 for a purpose later described.

The apparatus is operated as follows. The first constant pressure gas controller 1 is set to a pressure sufficient to secure an appropriate rate of gas flow through the first chromatographic column 4 with all of the on/off taps closed except the on/off tap 2 between the pressure controller and the sample introduction device. The second constant pressure controller 12 is set to provide a pressure equal to that arising in the second limb 7 and its on/off tap 13 opened. A sample is then injected and is carried into the first column 4. When it is desired to shunt part of the effluent from the first column, the on/off tap 9 between the cold trap 8 and the needle valve venting to the atmosphere 10 is opened. The needle valve is set to allow a rate of loss of gas to the atmosphere equal to or slightly in excess of the flow of gas through the first column. The carrier gas passes through the cold trap 8 to vent and the liquifiable components remain in the cold trap 8 whilst gas from the second constant pressure controller 12 flushes through the second column. When it is desired to pass the output from the first column 4 through the second column 11, the on/off tap 9 between the cold trap 8 and the atmosphere is closed.

In order to pass the contents of the cold trap through the second column it is only necessary to warm up the cold trap, to appropriately adjust the needle valve 15 and to open the on/off tap 16 between the outlet side of the cold trap 8 and the first constant pressure controller 1, and the carrier gas from controller 1 will carry the contents of the cold trap 8 into column 11.

It will be appreciated that if desired a chromatographic column may be substituted for the cold trap 8 and may be used as a "store" during the above procedure. In this case it is preferred that an independant source of constant pressure should be provided between 8 and 9 in place of line 14 so as to be able to provide a high back flushing pressure if desired.

If desired tap 2 may be closed during back flushing.

In order to prevent diffusion of materials passing from junction 5 to column 11 down line 6 a connection may be provided between a point between 15 and 16 to line 6 through a restriction, for example a needle valve.

In a second specific form of the invention in which the output of a first chromatographic column may be switched at will into one of two further chromatographic columns and which is now described with reference to FIG. 2, a first constant pressure controller 20 feeds through an on/off tap 21 a sample introduction device 22 which in turn leads to the first chromatographic column 23. The outlet side of this column feeds a junction 24 having one inlet and two outlet limbs each of the outlet limbs feeding chromatographic columns having a similar resistance to gas flow 25 and 26. A second constant pressure controller 27 feeds both outlet limbs through lines 28 and 29 provided with on/off taps 30 and 31. A further pipe 32 connects the said lines through a needle valve 33.

Tap 21 is not essential to the operation of the system but is provided for ease in setting it up.

This apparatus is operated as follows. The first constant pressure controller 20 is set at a pressure sufficient to provide an appropriate rate of flow through the first column and the second constant pressure controller 27 is set to provide a pressure at a point in either outlet limb of the junction 24 slightly greater than that arising at that point due to the flow of gas through the other limbs. Thus on opening one of the on/off taps 30 and 31 feeding the output limbs of the junction and closing the other, the gas from the first chromatographic column is directed through the limb to which the on/off tap is closed. By allowing a slight leakage of gas through the needle valve 33 which connects the lines feeding the outlet limbs, back diffusion of gas is avoided.

In a modification of the above device a line 40 which is shown dotted in FIG. 2, is provided for feeding the outlet side of at least one of the second columns with gas from the second constant pressure controller through an on/off tap 41 and a needle valve 42 in parallel. This form of the invention permits the hold-up of part of the sample in the said column by operating the apparatus as aforesaid and applying a pressure on the outlet side of the column equal to that on its inlet side when it is desired to hold part of the sample in the column. The needle valve 42 is adjusted to give a slow rate of flow when the on/off tap 41 is closed, to prevent any back diffusion.

In a second modification of the form of the invention illustrated in FIG. 2, which permits switching and hold-up of parts of the sample, one or both of the individual second columns is substituted by two columns in series. A line from the second constant pressure controller passes to the junction between the two columns in series through an on/off tap and a needle valve in parallel. By opening the on/off tap material may be held up in the first of the columns since the pressure will then be the same at the inlet and the outlet of the column whilst gas continues to flow through the second column.

The outlet columns 11, 25 or 26 in either of the above form of the invention may of course feed further switches according to the invention if desired.

It is apparent in both of these modifications, that a sufficient resistance to gas flow must exist between the constant pressure controller and the atmosphere to permit the pressure to be held. Also some detectors used in chromatography are sensitive to the rate of flow of gas through them. Both of these difficulties may be overcome by providing for eventual gas escape to the atmosphere through an adjustable valve. Preferably escape of gas from the detector through an on/off tap only is also provided for.

In a third specific form of the invention which is now described with reference to FIG. 3, the output of a first chromatographic column is switched at will into any one of three chromatographic columns.

The first constant pressure controller 50 feeds a sample introduction device 52 which in turn leads to the first chromatographic column 53. The outlet side of this column feeds a junction 54 having one inlet and three outlet limbs each of the outlet limbs feeding similar chromatographic columns 55, 56 and 57. A second constant pressure controller 58 feeds all three outlet limbs through lines 59, 60 and 61 provided with on/off taps 62, 63 and 64.

The apparatus is operated as follows; the first constant pressure controller 50 is set at a pressure sufficient to provide an appropriate rate of flow through the first column and the second constant pressure controller 58 is set to provide pressure at a point in any two outlet limbs of the junction 54 slightly greater than that arising at that point due to the flow of gas through the first column and one of the other limbs. Thus on opening two of the on/off taps 62, 63 and 64 and closing the other the gas from the first chromatographic column 53 is directed through the limb to which the on/off tap is closed.

The on/off taps may conveniently be provided in the form of a chamber with an inlet and three outlet ports, having a slide or movable arm which serves to block only one of the outlet ports; in this arrangement a single operation of the tap serves to close any one of the lines 59, 60 and 61 at option and to open both of the others.

Needle valves 65, 66 and 67 are situated in parallel with each of the on/off taps 62, 63 and 64 to permit a slow leak of gas into the lines feeding each outlet limb and thus prevent back diffusion into the line feeding the limb along which sample is passing.

I claim:

1. In combination, a gas chromatographic column, a simple source for supply to said column, means for discharging effluent gas from said column and a gas flow switch communicating with said discharge means, said switch comprising a gas flow-through junction having at least three limbs, one limb being a gas inlet limb communicating with said discharge means and receiving effluent therefrom and at least two other limbs being gas outlet limbs, means for passing said effluent gas into said inlet limb for flow through one of said outlet limbs, and means for switching said flow from one outlet limb to another, said switching means comprising means for maintaining a continuous flow of blocking gas at a controlled pressure to a point intermediate the ends of each outlet limb to prevent said effluent gas from passing therethrough except when an outlet limb is selected for such passage and means operatively associated with each outlet limb for selectively discontinuing the flow of blocking gas to said selected outlet limb to permit flow of the effluent gas therethrough while maintaining the flow of said blocking gas in all other outlet limbs.

2. Apparatus as claimed in claim 1 wherein the junction consists of the gas inlet limb and two outlet limbs.

3. Apparatus as claimed in claim 2 in which the controlled pressure is a constant pressure.

4. Apparatus as claimed in claim 1 in which the means for preventing effluent gas passing from the junction through the remaining limbs comprises means for passing gas at a controlled pressure to them.

5. Apparatus as claimed in claim 4 in which the same pressure source is used to supply all outlet limbs of the junction.

6. Apparatus as claimed in claim 5 in which the resistance to gas flow beyond each of the outlet limbs is substantially the same, which comprises a constant pressure source for feeding carrier gas to the column, a let-down valve, and means to feed each outlet limb intermediate the ends thereof with gas from the constant pressure source through the let-down valve.

7. Apparatus as claimed in claim 5 including a further chromatographic column having an output side connected to an outlet limb and means for feeding gas at substantially the same pressure as that fed to the outlet limbs of the junction to the output side of said further chromatographic column.

8. A process for controlling a flow of effluent gas stream from a gas chromatographic column whereby the flow of said stream can be switched from one path to another as desired, said process comprising the steps of passing the effluent gas stream through a junction having at least three limbs, one limb being a gas inlet limb for said effluent gas stream and the other limbs being gas outlet limbs, feeding a second gas stream to all outlet limbs other than a first selected one at a point intermediate the ends of said outlet limbs and at a slightly higher pressure than that arising due to the flow of effluent gas stream through the inlet limb and said first selected limb so that flow of said effluent gas stream through said outlet limbs is blocked except for said first selected outlet limb, continuously maintaining the feed of said second gas stream as indicated until the flow of said effluent gas stream is to be switched from said first selected outlet limb to another selected outlet limb, then selecting a different outlet limb according to the path desired for the flow of the effluent gas, discontinuing the flow of said second gas stream to said other selected outlet limb to permit flow of the effluent gas stream therethrough and feeding the second gas stream to said first selected outlet limb to block the flow of said effluent gas stream therethrough.

9. In a gas chromatographic apparatus, a chromatographic column, a sample source for supply to said column, means for feeding a carrier gas and a sample from said source through said column, means for discharging effluent gas from said column, and a gas flow switch communicating with said discharge means, said switch comprising a gas flow-through junction having at least three limbs, one limb being a gas inlet limb to receive said effluent gas and two other limbs being gas outlet limbs, means for maintaining a continuous flow of blocking gas at a controlled pressure to a point intermediate the ends of each outlet limb to prevent said effluent gas from passing therethrough except when an outlet limb is selected for such passage, and means operatively associated with each outlet limb for selectively discontinuing the flow of blocking gas to said selected outlet limb to permit flow of the effluent gas therethrough while maintaining the flow of said blocking gas in said other outlet limb and at least one chromatographic column fed by an outlet limb, any other outlet limb feeding a storage device.

* * * * *